(12) United States Patent  
Sahashi

(10) Patent No.: US 8,074,233 B2  
(45) Date of Patent: Dec. 6, 2011

(54) INFORMATION PROCESSING APPARATUS AND CONFIGURING METHOD

(75) Inventor: Masaya Sahashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/790,316

(22) Filed: May 28, 2010

(65) Prior Publication Data

US 2010/0306789 A1   Dec. 2, 2010

(30) Foreign Application Priority Data

May 28, 2009   (JP) .................. 2009-129256

(51) Int. Cl.  
G06F 15/163   (2006.01)
(52) U.S. Cl. .............. 719/327; 719/321; 719/323
(58) Field of Classification Search ............ 719/321, 719/323, 327  
See application file for complete search history.

(56) References Cited

FOREIGN PATENT DOCUMENTS

| JP | 05-257829 A | 10/1993 |
|---|---|---|
| JP | 09-008805 A | 1/1997 |
| JP | 09-101941 A | 4/1997 |
| JP | 10-301728 A | 11/1998 |
| JP | 11-353256 A | 12/1999 |
| JP | 2001-127976 A | 5/2001 |
| JP | 2004-062603 A | 2/2004 |
| JP | 2004-229190 A | 8/2004 |
| JP | 2005-037977 | 2/2005 |
| JP | 2005-037977 A | 2/2005 |
| JP | 2005-301913 | 10/2005 |
| JP | 2005-301913 A | 10/2005 |
| JP | 2006-155505 A | 6/2006 |
| JP | 2006-338543 A | 12/2006 |

OTHER PUBLICATIONS

Microsoft, "GPU Hang Detection and Recovery" (Jul. 15, 2007) [retrieved from http://download.microsoft.com/download/9/c/5/9c5b2167-8017-4bae-9fde-d599bac8184a/GPUHang_Det-Rec.doc on Mar. 22, 2011].*

Microsoft, "Timeout Detection and Recover of GPUs through WDDM" (Apr. 27, 2009) [retrieved from http://msdn.microsoft.com/en-us/windows/hardware/gg487368.aspx on Mar. 15, 2011].*

Sevenforums.com, "Windows 7—Windows 7 RC + nvlddmkm.sys BSOD" (May 18, 2009) [retrieved from http://www.sevenforums.com/graphic-cards/9297-windows-7-rc-nvlddmkm-sys-bsod.html on Mar. 22, 2011].*

Notice of Reasons for Rejection mailed by Japan Patent Office on Sep. 14, 2010 in the corresponding Japanese patent application No. 2009-129256.

* cited by examiner

*Primary Examiner* — Hyung S. Sough  
*Assistant Examiner* — Brian Wathen  
(74) *Attorney, Agent, or Firm* — Knobbe, Martens, Olson & Bear, LLP

(57) ABSTRACT

According to one embodiment, an information processing apparatus includes a monitoring module which periodically transmits a message to a device driver which controls a device controller in accordance with an instruction issued by a program executed by a CPU to drive a peripheral device, and initializes the device driver when a response to the message is not issued received. The information processing apparatus further includes a setting module which sets an interval of transmission of the message based on a predetermined rule.

3 Claims, 5 Drawing Sheets

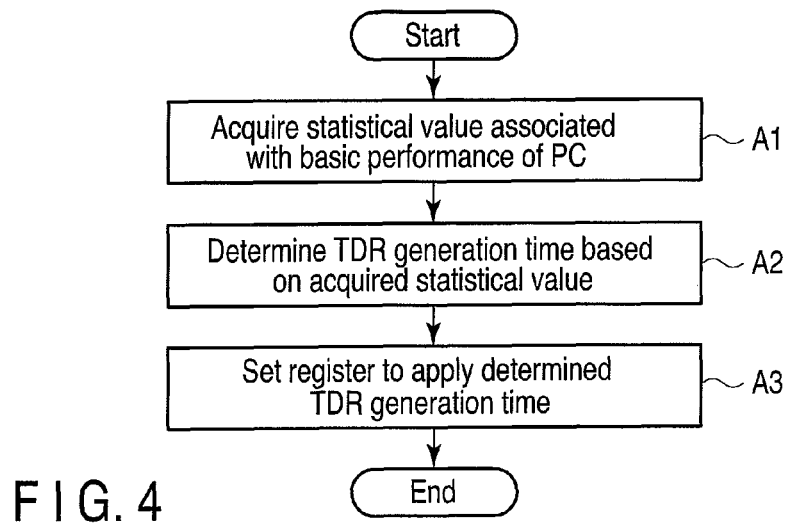
F I G. 4
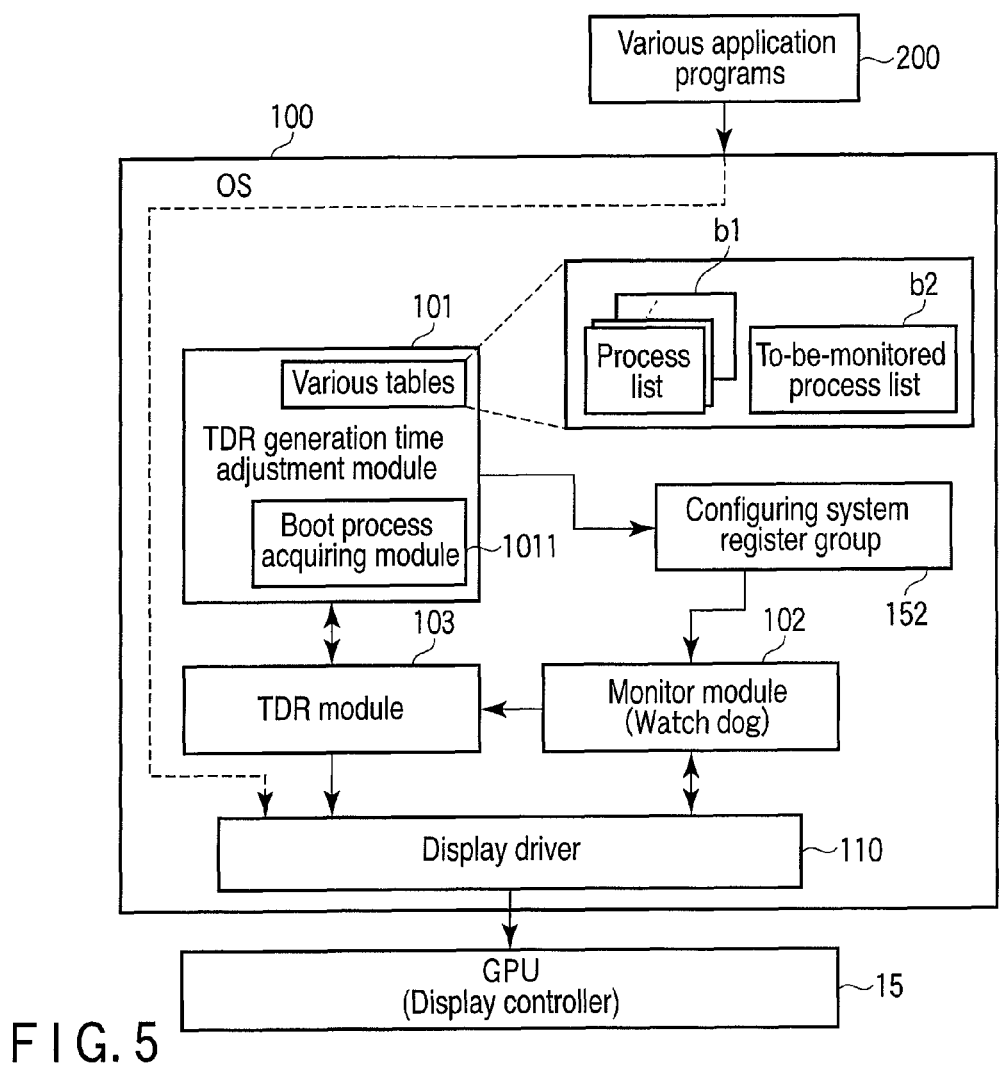
F I G. 5

INFORMATION PROCESSING APPARATUS AND CONFIGURING METHOD

CROSS-REFERENCE TO RELATED APPLICATIONS

This application is based upon and claims the benefit of priority from Japanese Patent Application No. 2009-129256, filed May 28, 2009, the entire contents of which are incorporated herein by reference.

FIELD

Embodiments described herein relate generally to a configuration technique used in an information processing apparatus such as a personal computer (PC), for example.

BACKGROUND

Recently, various types of PCs such as desktop computers and notebook personal computers are widely used. Further, recently, an attempt is made to enhance the performance of a graphics processing unit (GPU) and, for example, game software that provides a high-quality image utilizing a three-dimensional image by means of a PC, for example.

The resource management of a PC is made by use of an operating system (OS). Some OSs include a function of monitoring the operation condition of preset software executed on the PC and recovering software in which the occurrence of a bug is detected when detecting that a bug occurs in the software as one part of the resource management and initializing. As one method for detecting the occurrence of a bug, a timeout process is well known. To date, various mechanisms for preventing the timeout process from being performed at a time unsuitable for the user have been proposed (for example, see Jpn. Pat. Appln. KOKAI Publication No. 2005-37977).

For example, Microsoft Windows (registered trademark) Vista includes a timeout detection and recovery (TDR) function. The TDR function is designed to perform one type of timeout process of transmitting a message for confirming normal operation to a display driver at regular intervals and initializing the display driver to recover when a response to the message is not issued. Thus, automatic return when the screen is "frozen" is realized.

The performance of PCs greatly varies according to the grade of the central processing unit (CPU), GPU and the like. In spite of this fact, generation intervals of TDR are generally set at the same value (time) for the respective PCs. Therefore, if game software that provides a high-quality screen on a PC with low performance is executed, the display driver, which is in a busy state, cannot respond to the TDR message and erroneously determines that a bug has occurred. As a result, there occurs a problem that the display driver is initialized and recovered. That is, a problem that, the user cannot continuously execute desired game software on a low-performance PC due to the TDR function has newly occurred.

BRIEF DESCRIPTION OF THE DRAWINGS

FIG. 4 is an exemplary flowchart showing the operation procedure of a TDR generation time adjustment module in the information processing apparatus of the first embodiment;

FIG. 5 is an exemplary diagram for illustrating the operation principle associated with a display process by an operating system that performs resource management of an information processing apparatus according to a second embodiment of the invention.

DETAILED DESCRIPTION

In general, according to one embodiment, an information processing apparatus includes a monitoring module which periodically transmits a message to a device driver which controls a device controller in accordance with an instruction issued by a program executed by a CPU to drive a peripheral device, and initializes the device driver when a response to the message is not issued/received. The information processing apparatus further includes a setting module which sets an interval of transmission of the message based on a predetermined rule.

First Embodiment

First, a first embodiment of the invention is explained.

Figure 1:
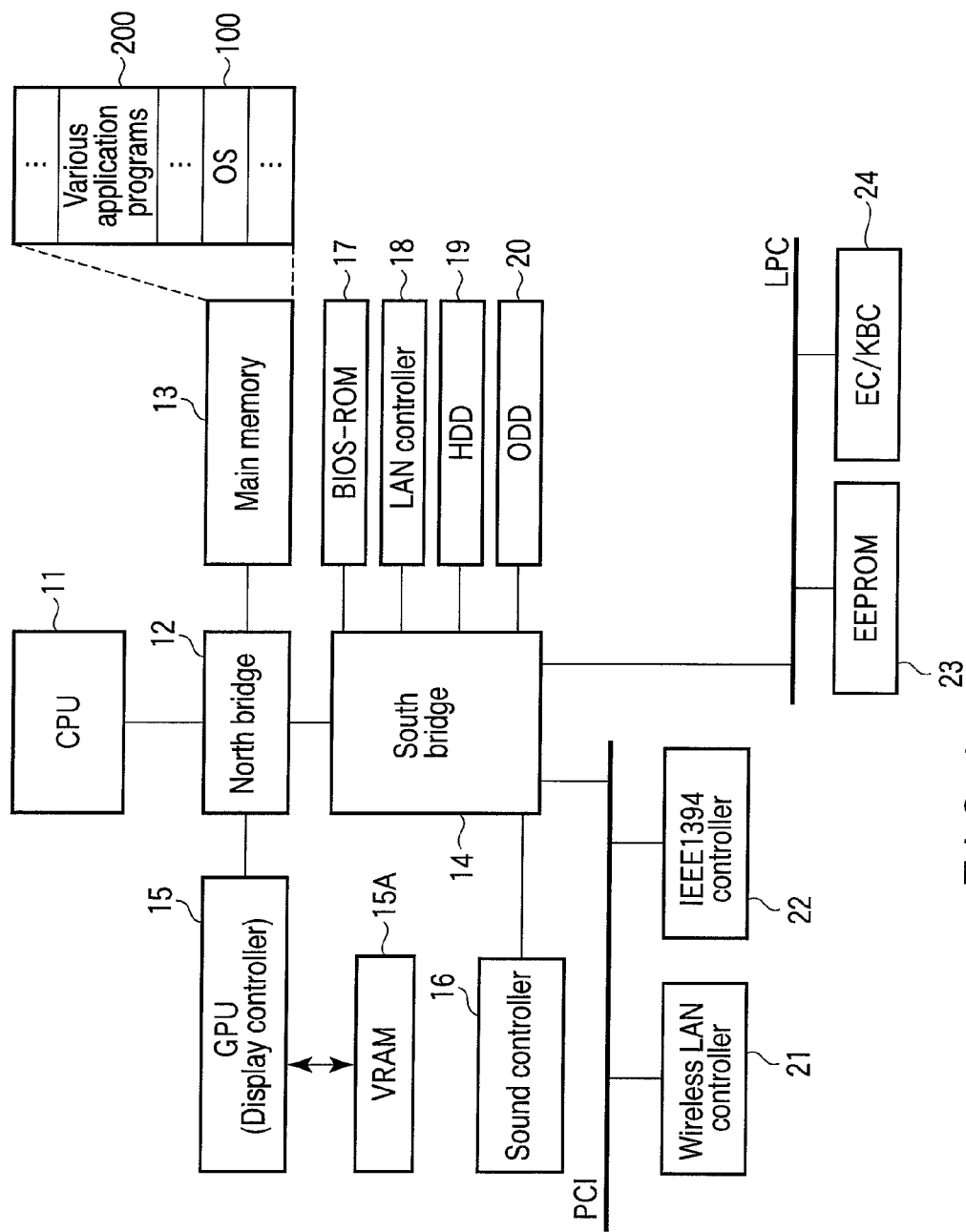
FIG. 1 is an exemplary diagram showing the system configuration of an information processing apparatus according to a first embodiment of the invention.

FIG. 1 is an exemplary diagram showing the system configuration of an information processing apparatus according to the embodiment. The information processing apparatus is realized as a personal computer (PC).

As shown in FIG. 1, the computer includes a CPU 11, a north bridge 12, a main memory 13, a south bridge 14, a GPU 15, a video memory (VRAM) 15A, a sound controller 16, a basic input/output system (BIOS)-read only memory (ROM) 17, a local area network (LAN) controller 18, a hard disk drive (HDD) 19, an optical disk drive (ODD) 20, a wireless LAN controller 21, an IEEE 1394 controller 22, an electrically erasable programmable ROM (EEPROM) 23, an embedded controller/keyboard controller (KC/KBC) and the like.

The CPU 11 is a processor that controls the operation of the computer and executes an OS 100 and various application programs 200 operating under the OS 100 that are loaded from the HDD 19 and ODD 20 to the main memory 13. As one of the various application programs 200, for example, various types of gate software that provide high-quality screens utilizing three-dimensional images are executed on the computer. Further, the CPU 11 also executes a BIOS stored in the BIOS-ROM 17.

The north bridge 12 is a bride device that connects the local bus of the CPU 11 with the south bridge 14. A memory controller that access-controls the main memory 13 is contained in the north bridge 12. Further, the north bridge 12 includes a function of making communication with the GPU 15 via a serial bus of the peripheral component interconnect (PCI) Express standard or the like.

The GPU 15 is a display controller that controls a liquid crystal display (LCD) or the like used as a monitor of the computer. An accelerator that draws an image to be displayed by the various application programs 200 instead of the CPU 11 is mounted on the GPU 15.

The south bridge 14 controls various devices on a PCI bus and various devices on a low pin count (LPC) bus. The south bridge 14 contains an integrated device electronics (IDE) controller used to control the HDD 19 and ODD 20. Further, the south bridge 14 includes a function of making communication with the sound controller 16.

The sound controller 16 is a sound source device and outputs audio data to be reproduced by the various application programs 200 to a speaker.

The LAN controller 18 is a wire communication device that makes wire communication of the IEEE 802.3 standard, for example. The wireless LAN controller 21 is a wireless communication device that makes wireless communication of the IEEE 802.11 standard, for example. The IEEE 1394 controller 22 makes communication with an external device via a serial bus of the IEEE 1394 standard.

The EC/KBC 24 is a one-chip micro processing unit (MPU) in which an embedded controller to perform power management and a keyboard controller to control the keyboard and pointing device are integrated.

Figure 2:
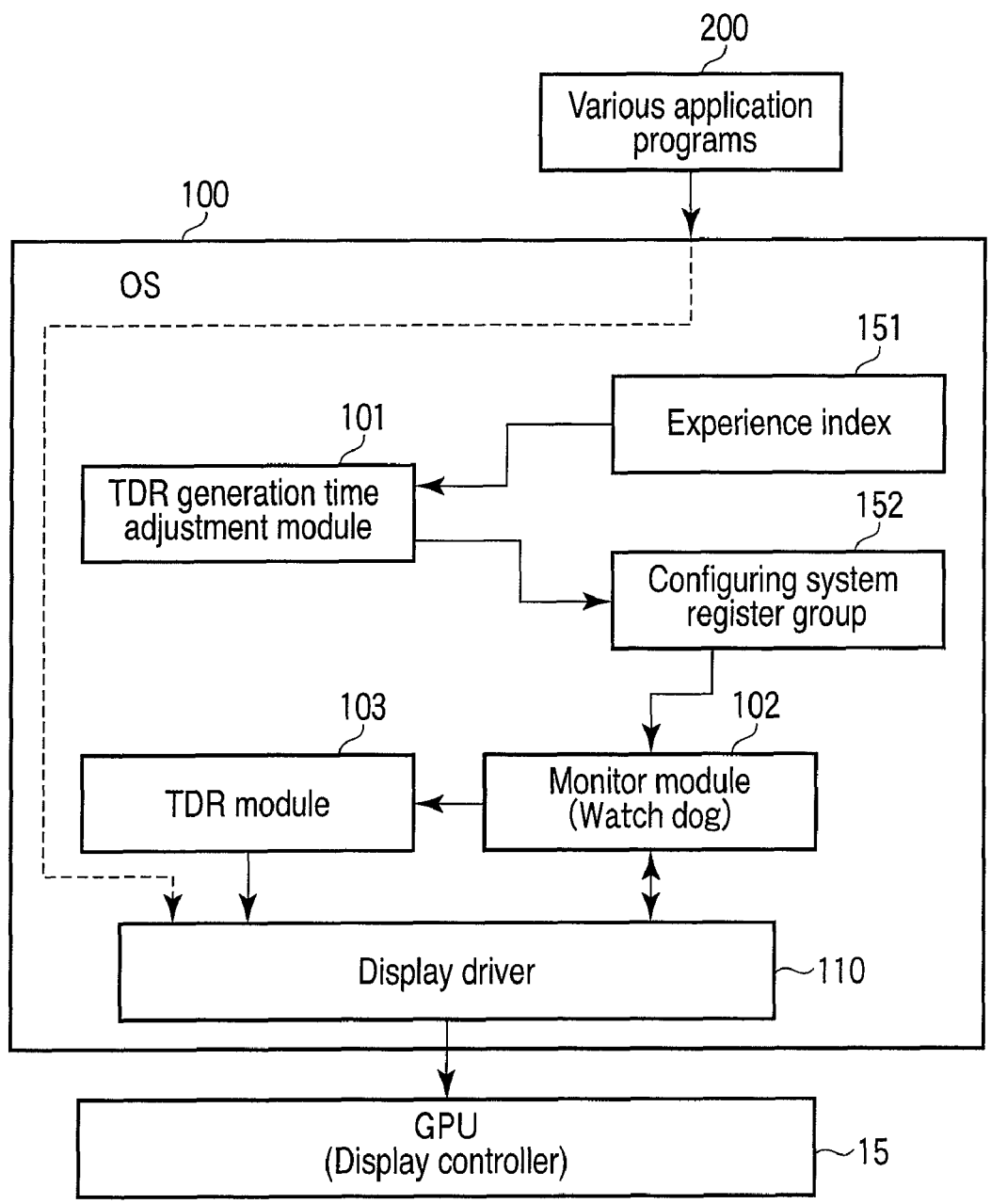
FIG. 2 is an exemplary diagram for illustrating the operation principle associated with a display process of an operating system that performs resource management of the information processing apparatus of the first embodiment.

Next, the operation principle associated with a display process by the OS 100 that performs resource management of the computer with the above configuration is explained with reference to FIG. 2.

The OS 100 includes a display driver 110 that drives and controls the GPU 15. The display driver 110 operates the GPU 15 to draw an image instead of the CPU 11 and display an image on the LCD in response to a request from the various application programs 200.

Further, the OS 100 includes a processing portion of a TDR generation time adjustment module 101, a monitor module 102 and a TDR module 103 and a data portion of an experience index 151 and a configuration system register group 152.

The monitor module 102 transmits a message used to confirm that the normal operation is performed to the display driver 110 at regular intervals. If no response to the message is issued, the monitor module 102 determines that the display driver 110 is "frozen" and notifies that effect to the TDR module 103. The TDR module 103 that has received the above notification initializes the display driver 110 to recover.

Figure 3:
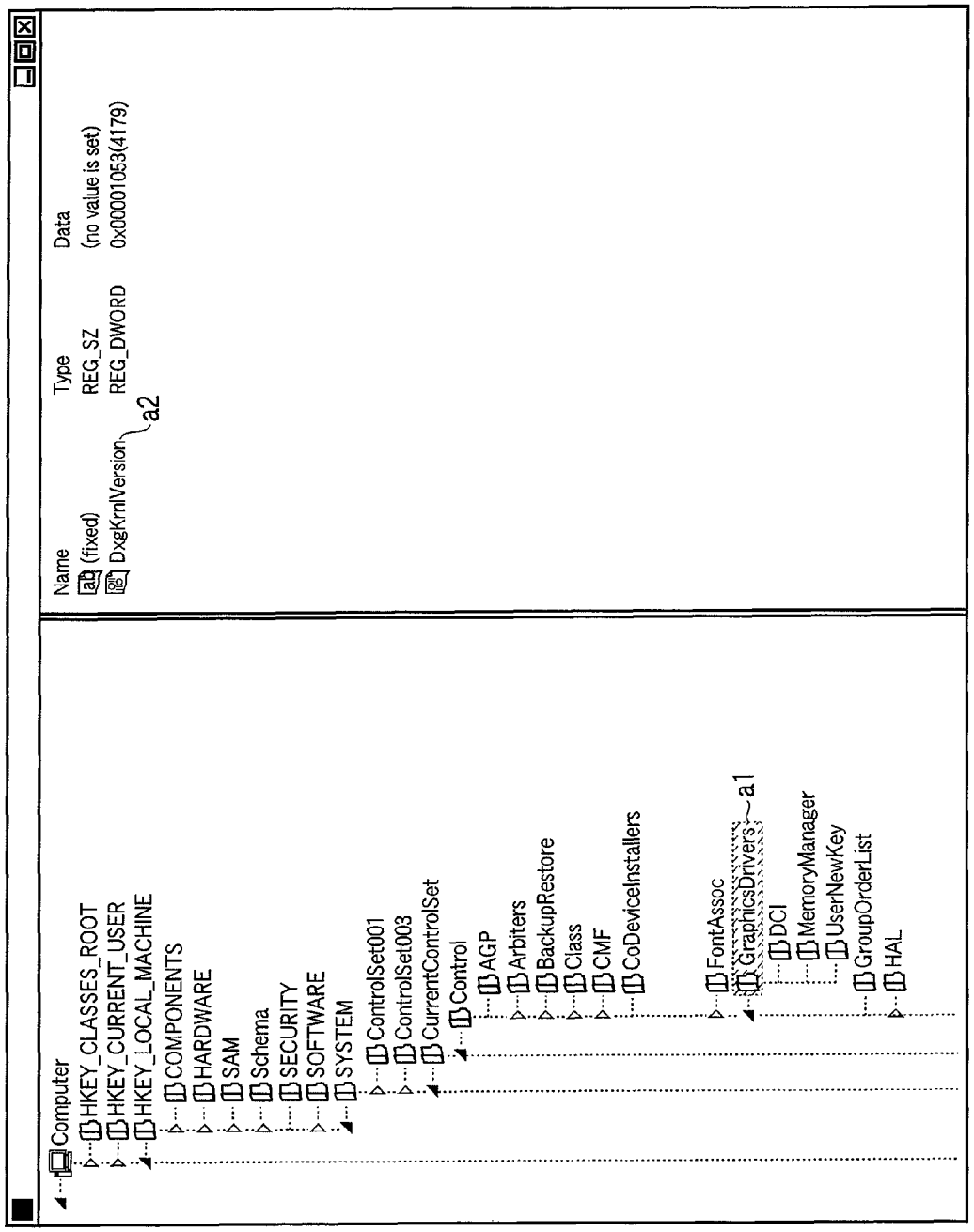
FIG. 3 is an exemplary diagram showing one example of the data structure of a configuration system register group provided in the information processing apparatus of the first embodiment.

The interval at which the monitor module 102 transmits a message to the display driver 110 is defined by a value of the configuration system register group 152. FIG. 3 is an exemplary diagram showing one example of the data structure of the configuration system register group 152. A value of a preset bit string in data with a name of "DxgKrnlVersion" (a2) stored in a "GraphicsDrivers" folder (a1) indicates the interval at which a message is transmitted to the display driver 110.

It is general to uniformly set the same value as the interval of message transmission to the display driver 110 by the monitor module 102 defined by "DxgKrnlVersion" (a2) irrespective of the performance of the computer. In contrast, in the present computer, the TDR generation time adjustment module 101 is provided in the OS 100 and the interval of message transmission to the display driver 110 by the monitor module 102 is optimized according to the performance of each computer. This is explained in detail in the following description.

The OS 100 includes a function of collecting statistical information used to evaluate the performance of the computer and supplying the statistical information to the user. The statistical information is managed as a score of the experience index 151. Then, the TDR generation time adjustment module 101 acquires the statistical information managed as a score of the experience index 151, determines the interval of message transmission to the display driver 110 by the monitor module 102 based on the acquired statistical information and sets the value in "DxgKrnlVersion" (a2).

More specifically, in a case where the performance of the computer indicated as a score of the experience index 151 does not reach a preset level, a value of the configuration system register group 152 is updated to increase the interval of message transmission to the display driver 110 by the monitor module 102. At this time, two values may be selectively set according to whether the performance of the computer is higher or lower than the preset level or three or more values may be selectively set in a multi-level range according to the performance of the computer.

That is, in this computer, the interval of message transmission to the display driver 110 by the monitor module 102 is optimized according to the performance thereof by the TDR generation time adjustment module 101. Therefore, for example, it becomes possible to enjoy game software or the like that has caused initialization of the display driver 110 by the TDR module 103 (for example, that provides a high-quality screen by use of a three-dimensional image) on a computer which includes only low-level performance and tends to set the display driver 110 into a busy state.

FIG. 4 is an exemplary flowchart showing the operation procedure of the TDR generation time adjustment module 101 in the embodiment.

First, the TDR generation time adjustment module 101 acquires statistical information associated with the basic performance of the computer (block A1). The TDR generation time adjustment module 101 determines an interval of message transmission to the display driver 110 by the monitor module 102 based on the acquired statistical information (block A2). Then, the TDR generation time adjustment module 101 sets a value of the configuration system register group 152 to apply the thus determined interval (block ).

Thus, the computer can dynamically change the configuration according to the performance thereof.

Second Embodiment

Next, a second embodiment of the invention is explained.

FIG. 5 is an exemplary diagram for illustrating the operation principle associated with a display process of an operating system that performs resource management of an information processing apparatus according to the embodiment.

In the first embodiment described above, the TDR generation time adjustment module 101 optimizes the interval of message transmission to the display driver 110 by the monitor module 102 based on the statistical information collected by the OS 100. In this embodiment, application programs 200 that could cause initialization of the display driver 110 by the TDR module 103 are listed up. Then, when the application program 200 which is listed up is booted, a value of the configuration system register group 152 is updated to increase the interval of message transmission to the display driver 110 by the monitor module 102.

For this purpose, the TDR generation time adjustment module 101 of this embodiment includes a boot process acquiring module 1011. The boot process acquiring module 1011 is a module that acquires an identifier of a program booted at this time and acquires an identifier of a newly booted program (and a stopped program). The TDR generation time adjustment module 101 first creates a first process list "b1" by listing up a program booted immediately after the OS 100 is booted by use of the boot process acquiring module 1011.

Further, the TDR generation time adjustment module 101 secondly creates a second process list "b1" by listing up a program booted when notification is made from the monitor module 102 to the TDR module 103, that is, when the display driver 110 is initialized by the TDR module 103 by use of the boot process acquiring module 1011. A preset number of second process lists "b1" starting from the nearest list are managed.

Further, the TDR generation time adjustment module 101 creates a third process list "b1" by listing up only a program that is listed up in each of a plurality of second process lists "b1". Then, the TDR generation time adjustment module 101 creates a to-be-monitored process list "b2" by listing up a program that is listed up in the third process list "b1" and is not listed up in the first process list "b1".

The TDR generation time adjustment module 101 monitors whether the program listed up in the to-be-monitored process list "b2" is booted or not by use of the boot process acquiring module 1011. Then, when detecting that the program listed up in the to-be-monitored process list "b2" is booted, the module updates a value of the configuration system register group 152 to increase the interval of message transmission to the display driver 110 by the monitor module 102. When detecting that the program listed up in the to-be-monitored process list "b2" is stopped, the TDR generation time adjustment module 101 updates a value of the configuration system register group 152 to set the value back to the original reference value.

Further, after updating the value of the configuration system register group 152, the TDR generation time adjustment module 101 monitors the frequency of occurrence of initialization of the display driver 110 by the TDR module 103 and further updates a value of the configuration system register group 152 in stages as required. For example, the frequency of occurrence is acquired by managing each occurrence time and collecting the number of initializations that have occurred in a period corresponding to a preset period of time counted from the above time in a backward direction.

As a result, in this computer, the interval of message transmission to the display driver 110 by the monitor module 102 is optimized to be increased by the TDR generation time adjustment module 101 when an application program 200 that could cause initialization of the display driver 110 by the TDR module 103 is booted. Therefore, like the first embodiment, for example, it becomes possible to enjoy game software or the like that causes initialization of the display driver 110 by the TDR module 103 (for example, that provides a high-quality screen by use of a three-dimensional image) on a computer which includes only low-level performance and tends to be set the display driver 110 into a busy state.

Figure 6:
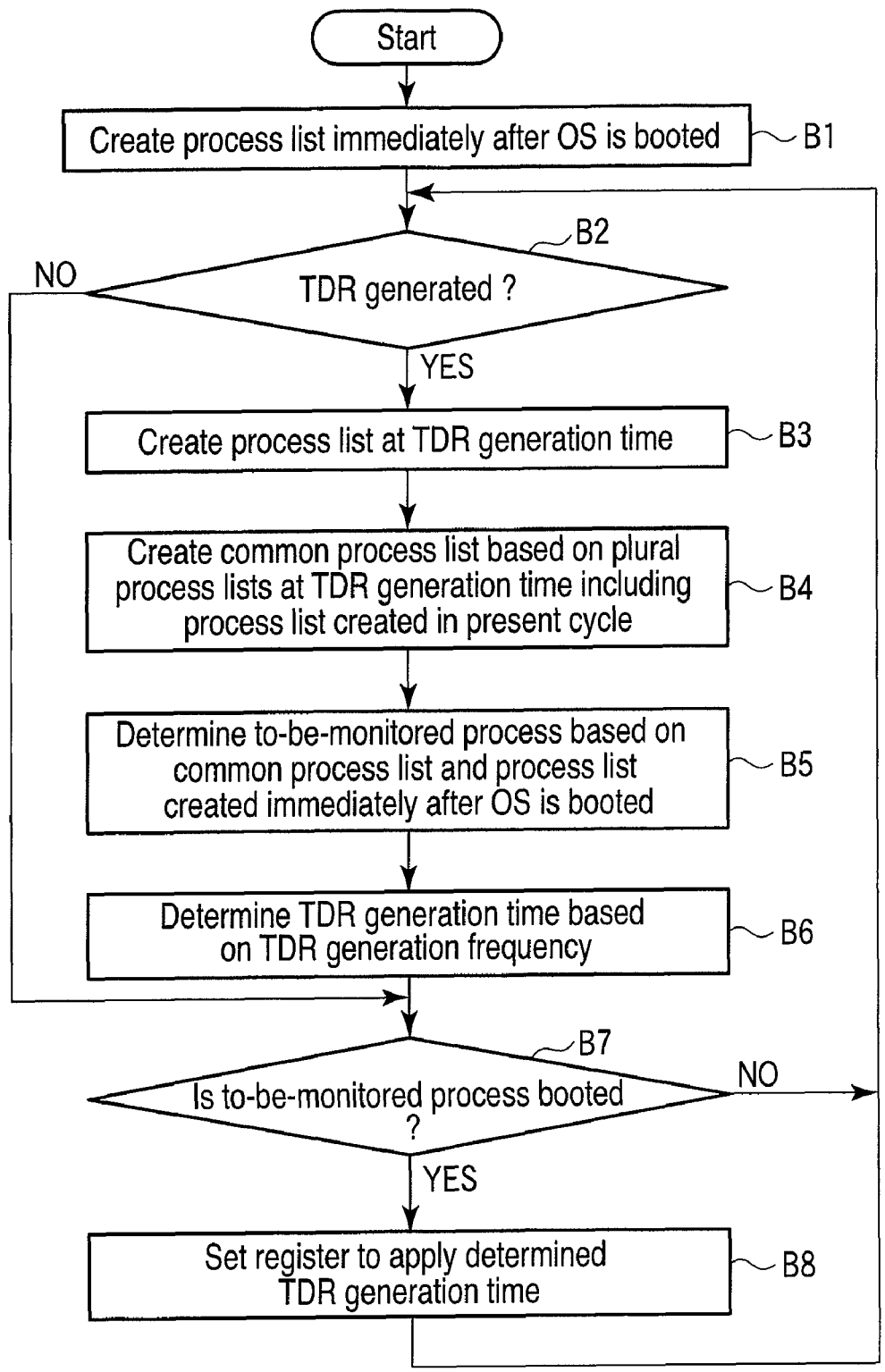
FIG. 6 is an exemplary flowchart showing the operation procedure of a TDR generation time adjustment module in the information processing apparatus of the second embodiment.

FIG. 6 is an exemplary flowchart showing the operation procedure of the TDR generation time adjustment module 101 in this embodiment.

The TDR generation time adjustment module 101 first creates a process list by listing up a program booted immediately after the OS 100 is booted (block B1).

After this, the TDR generation time adjustment module 101 monitors whether initialization of the display driver 110 by the TDR module 103 occurs or not (block B2). When detecting the occurrence of initialization (YES in block B2), the module creates a process list by listing up a program booted at the time of occurrence (block B3). Then, the TDR generation time adjustment module 101 creates a common process list by listing up only programs listed up in all of the process lists from a plurality of process lists, which are including the process list created in this cycle, created by listing up programs booted at the occurrence time of initialization of the display driver 110 by the TDR module 103 and (block B4).

Subsequently, the TDR generation time adjustment module 101 creates a to-be-monitored process list by listing up a program that is listed up in a common process list and is not listed up in a process list created by listing up a program booted immediately after the OS 100 is booted based on the process list created by listing up a program booted immediately after the OS 100 is booted and the common process list created by listing up only programs listed up in all of the process lists (block B5).

Further, the TDR generation time adjustment module 101 determines an interval of message transmission to the display driver 110 by the monitor module 102 that is set when a program listed up in the to-be-monitored process list is booted based on the number of initializations (the frequency of occurrence) occurring in a period corresponding to a preset period of time counted from the occurrence time of initialization of the display driver 110 by the TDR module 103 in this cycle in a backward direction (block B6).

Then, the TDR generation time adjustment module 101 monitors whether the program listed up in the to-be-monitored process list is booted or not (block B7). If the booting operation is detected (YES in block B7), the module updates a value of the configuration system register group 152 to apply the interval determined in block B6 (block B8).

Thus, in this computer, the configuration can be dynamically made according to the respective conditions.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a central processing unit (CPU);
   a device controller configured to control a peripheral device;
   a device driver configured to cause the device controller to operate the peripheral device in accordance with a program executed by the CPU;
   a monitoring module configured to periodically transmit a message to the device driver and to initialize the device driver when a response to the message is not received; and
   a setting module configured to:
      manage a first list indicating a program executed by the CPU immediately after an operating system is booted, and at least one second list indicating a program executed by the CPU when the device driver is initialized by the monitoring module;
      select a program that is on the at least one second list and is not on the first list, as a program considered to cause initialization of the device driver; and
      change an interval of transmission of the message from a first value defined as an initial setting value to a second value larger than the first value when execution of the selected program is started by the CPU.

2. The apparatus of claim 1, wherein:
the device controller comprises a display controller, and the device driver comprises a display driver.

3. A configuring method for an information processing apparatus, the method comprising:
periodically monitoring whether a display driver has generated a timeout and initializing the display driver when detecting that the timeout was
managing a first list indicating a program booted immediately after an operating system is booted and at least one second list indicating a program booted when the device driver is initialized by the monitoring function;
selecting a program that is on the at least one second list and is not on the first list as a program considered to cause initialization of the display driver; and
changing an interval of a monitoring operation by the monitoring function from a first value defined as an initial setting value to a second value larger than the first value when the selected program is booted.

* * * * *